United States Patent
Mitani et al.

(12) 
(10) Patent No.: US 6,707,993 B1
(45) Date of Patent: Mar. 16, 2004

(54) LENS BARREL

(75) Inventors: Yoshifumi Mitani, Sakai (JP); Hisanori Kohno, Izumiotsu (JP); Tetsuya Uno, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/376,245

(22) Filed: Mar. 3, 2003

(30) Foreign Application Priority Data

Dec. 2, 2002 (JP) ........................................ 2002-349843

(51) Int. Cl.$^7$ .............................. G03B 5/00; G02B 15/14
(52) U.S. Cl. .......................................... 396/72; 359/696
(58) Field of Search .................... 396/72; 359/694, 359/696

(56) References Cited

U.S. PATENT DOCUMENTS 5,659,810 A * 8/1997 Nomura et al. ............... 396/72
6,052,535 A    4/2000 Uno ............................ 396/72

FOREIGN PATENT DOCUMENTS

JP    P2000-66081 A    3/2000    ............ G02B/7/04
JP    P2001-183563 A   7/2001    ............ G02B/7/02

* cited by examiner

Primary Examiner—W. B. Perkey
(74) Attorney, Agent, or Firm—McDermott, Will & Emery (57) ABSTRACT

A compact lens housing which is of a multistage type in which it is projected and retracted through three stages. The lens housing includes three pairs, each of which is composed of a straight-moving member which is movable in an axial direction of the lens housing but not rotatable and is composed of a rotation member which can rotate relative to the straight-moving member, in which the rotation member moves integrally together with the straight-moving member in the axial direction. The straight-moving members of the three pairs have straight-moving interlocking parts, respectively, and the straight-moving interlocking parts slidably engage with each other so as to be able to move in the axial direction. The straight-moving interlocking parts are arranged generally in the same circumference when the lens housing is viewed in the axial direction.

16 Claims, 6 Drawing Sheets

LENS BARREL

This application is based upon application No. 2002-349843 filed in Japan, the contents of which are hereby incorporated by reference.

BACKGROUND OF THE INVENTION

1. Field of the Invention

The present invention generally relates to a lens barrel, and particularly relates to the lens barrel which is suitable for a multistage zoom lens (or multiple-step zoom lens).

2. Description of the Related Art

Conventionally, there have been proposed a variety of lens barrels each of which is of a type in which the lens barrel can be projected from its camera body. For examples, each of Japanese Laid-Open Patent Publication No. 2000-66081 and Japanese Laid-Open Patent Publication No. 2001-183563 discloses a lens barrel which is of the type in which the lens barrel can be projected from its camera body by two steps or by two stages. On the other hand, U.S. Pat. No. 6,052,535 discloses a lens barrel which is of the type in which the lens barrel can be projected from its camera body by three steps or by three stages.

The conventional zoom lens barrel which projects from its camera body by two steps, generally, has a straight-moving member which is guided linearly by a fixed barrel (or a stationary barrel), and it has a first rotation member which is positioned radially outside the straight-moving member, which moves integrally therewith in a direction of its optical axis, and which is rotatable relative to the straight-moving member. In addition, the zoom lens barrel has a second rotation member which is positioned radially inside the straight-moving member, which moves relative to the straight-moving member in the direction of the optical axis, and which rotates and interlocks with the first rotation member, where a rotation interlocking piece mounted on the second rotation member is inserted inside an elongate hole formed on the straight-moving member.

According to the conventional zoom lens barrel, however, many components or elements superimpose one over another in its radial direction. Therefore, it is difficult to make the zoom lens barrel small or compact. Also, because the straight-moving member has a low rigidity owing to the presence of the elongate hole, it is difficult to realize a high accuracy for driving and a high anti-shock nature (or a high shock-resistant nature). Also, because there is need of adding a light blocking member (or a light shielding member) in the mechanism, it is difficult to avoid a high cost thereof. Also, in a case of developing the mechanism of the projection of the zoom lens barrel by two steps into a mechanism of the projection of the zoom lens barrel by three steps, there arises a problem of how the straight-moving interlocking mechanism for limiting its rotation should be constructed.

Also, the multistage projection tripe of lens barrel has a straight-moving member for limiting the rotation thereof, and it has a rotation member which rotates relative to the straight-moving member. More specifically, in the mechanism, there are provided a plurality of pairs, each of which is composed of the straight-moving member and the rotation member, and each of which moves integrally in the direction of the optical axis. Between the adjacent pairs, the straight-moving members are interlocked with each other in terms of their straight movement, and the rotation members are interlocked with each other in terms of their rotation. The pairs move relative to each other in the direction of the optical axis on the basis of mutual engagement between the straight-moving member of one of the adjacent pairs and the straight-moving member of the other thereof, so that the lens barrel can project (or expand) and contract (or retract).

The conventional lens barrel having the mechanism of projection by more than two steps, has a construction in which there is mounted the straight-moving member between the front and rear rotation members.

For example, in a case of a mechanism in which the rotation member of one of the pairs is connected to the straight-moving member of the other of the pairs by screw so that the one of the pairs projects from the other of the pairs in which the rotation member is arranged radialy and outwardly of the straight-moving member, there is need of forming a space extending spirally (or helically) on the straight-moving member of the other of the pairs in order to transmit rotation between the rotation member of the one of the pairs and the rotation member of the other thereof.

According to the mechanism, the rigidity of the straight-moving member of the other of the pairs is relatively lower owing to the spiral space formed therein. Therefore, for example, considering the exertion of any excessive power on the lens barrel in the axial direction, not only there exists a limitation to reduction of dimension of the straight-moving member of the other of the pairs in the radial direction, but also there exists a limitation to increase, for increasing the accuracy in control, of rotational angle of the rotation member. Furthermore, in order to prevent light from entering the spiral space of the straight-moving member of the other of the pairs, the light blocking mechanism (or light shielding mechanism) can not help but be complicated in structure.

Accordingly, there has not yet been provided a lens barrel, with a low cost and a high rigidity thereof, having a mechanism of projection thereof by more than two steps, in which the lens barrel is compact or small-sized.

SUMMARY OF THE INVENTION

Therefore, it is an object of the present invention to provide a lens barrel which can project and retract by taking more than two steps or stages, in which the lens barrel can be downsized or can be made compact.

In accomplishing this and other objects of the present invention, according to one aspect thereof, there is provided a lens barrel comprising: a fixed lens barrel member; a first straight-moving member for guiding a first lens barrel member movably in an axial direction of the fixed lens barrel member; a second straight-moving member for guiding a second lens barrel member movably in the axial direction of the fixed lens barrel member, in which the second straight-moving member is provided generally on a same circle or circumference, in a plane perpendicular to the axial direction thereof, as that of the first straight-moving member; and a third straight-moving member for guiding a third lens barrel member movably in the axial direction of the fixed lens barrel member, in which the third straight-moving member is provided generally on the same circle or circumference, in the plane perpendicular to the axial direction thereof, as that of the first straight-moving member.

In the mechanism, a first pair composed of the first straight-moving member and the first lens barrel member as a first step (or as a first stage, or as a first level) with respect to the fixed lens barrel member, a second pair composed of the second straight-moving member and the second lens barrel member as a second step (or as a second stage, or as a second level) therewith, and a third pair composed of the third straight-moving member and the third lens barrel member as a third step (or as a third stage, or as a third level) therewith, can project from each other with respect to the fixed lens barrel. According to the mechanism, the first straight-moving member, the second straight-moving member and the third straight-moving member, are provided or arranged generally on the same circumference, or circle, in the plane perpendicular to the axial direction of the fixed lens barrel. Consequently, with the mechanism, the thickness of the first straight-moving member, the thickness of the second straight-moving member and the thickness of the third straight-moving member, do not accumulate in a direction of radius of the lens barrel; therefore, the lens barrel which can project and retract by taking more than two steps and which can be made compact in size, is provided.

As an embodiment, a lens barrel member of at least one of the first pair, the second pair, and the third pair, is relatively rotatably connected to its corresponding straight-moving member, in which the lens barrel member and the straight-moving member can move integrally in the axial direction.

As an embodiment, a location of each of the first straight-moving member, the second straight-moving member and the third straight-moving member, is more inward radially than any location of the first lens barrel member, the second lens barrel member and the third lens barrel member.

In accomplishing the above objects of the present invention, according to another aspect thereof, there is provided a lens barrel comprising: a fixed member; a first pair which has a first straight-moving member having a straight-moving interlocking part wherein the first straight-moving member is movably guided by the fixed member in an axial direction of the lens barrel, and which has a first rotation member that is relatively rotatably connected to the first straight-moving member, wherein the first rotation member moves integrally with the first straight-moving member in the axial direction; a second pair which has a second straight-moving member having a first straight-moving interlocking part that engages movably with the straight-moving interlocking part of the first straight-moving member in the axial direction and having a second straight-moving interlocking part different from the first straight-moving interlocking part, and which has a second rotation member that is relatively rotatably connected to the second straight-moving member, wherein the second rotation member moves integrally with the second straight-moving member in the axial direction, and wherein the second pair can project on a side of an object to be photographed with respect to the first pair; and a third pair which has a third straight-moving member having a straight-moving interlocking part that engages movably with the second straight-moving interlocking part of the second straight-moving member in the axial direction, and which has a third rotation member that is relatively rotatably connected to the third straight-moving member, wherein the third rotation member moves integrally with the third straight-moving member in the axial direction, and wherein the third pair can project on the side of the object to be photographed with respect to the second pair, wherein the straight-moving interlocking part of the first straight-moving member, the first straight-moving interlocking part of the second straight-moving member, the second straight-moving interlocking part of the second straight-moving member, and the straight-moving interlocking part of the third straight-moving member, are provided or arranged generally on a same circle or circumference in a plane perpendicular to the axial direction thereof.

In other words, the zoom lens barrel includes at least three pairs, each of which has a straight-moving member (i.e. first straight-moving member, second straight-moving member or third straight-moving member) that is prevented from rotating, and each of which has a rotation member (i.e. first rotation member, second rotation member or third rotation member) that is rotatably connected to the straight-moving member and that moves integrally together with the straight-moving member in the axial direction of the lens barrel. In the mechanism, the straight-moving interlocking parts of the three pairs engage with each other movably in the axial direction, and each of the straight-moving interlocking members of the three pairs is arranged generally on the same circle or circumference in the plane perpendicular to the axial direction.

In the mechanism, the mutual engagement between the straight-moving interlocking parts of the three straight-moving members prevents mutual rotation between the straight-moving members. In the mechanism, the straight-moving member and/or the rotation member, in each pair, can have a cam (or cams), a helicoid (or helicoids), or the like, by which the pairs can move relative to each other and relative to the fixed member in the axial direction due to the rotation of the rotation members relative to the straight-moving members, so that at least the three pairs (i.e. first pair, second pair and third pair) can project, as at least three steps, from the fixed member.

According to the mechanism, when the rotation member rotates relative to the straight-moving member, a force for stopping, or blocking, the rotation of the rotation member, is exerted on a circumference, or periphery, of the straight-moving member. Although the force therefore is exerted on, or transmitted to, each of the straight-moving interlocking parts of the first, second and third straight-moving members, the path for transmitting the force does not deviate in the radial direction of the lens barrel because each of the straight-moving interlocking parts thereof are provided generally on the same circumference, or circle, in the plane perpendicular to the axial direction. In other words, the location, or position, of action of force exerting thereon in the circumferential direction, does not deviate radially between the straight-moving interlocking parts thereof back and forth in the axial direction, and thus any couple of forces due to such a deviation in the location of action of force do no occur. Therefore, with the mechanism, it is possible to assure enough strength of the straight-moving members without making the straight-moving members bigger or larger in size.

Consequently, with the mechanism, the lens barrel which can project and retract by taking more than two steps, in which the lens barrel can be downsized or can be made compact, is provided.

As an embodiment, each of the straight-moving interlocking part of the first straight-moving member, the first straight-moving interlocking part of the second straight-moving member, the second straight-moving interlocking part of the second straight-moving member, and the straight-moving interlocking part of the third straight-moving member, is more inward radially than any location of the first rotation member, the second rotation member and the third rotation member.

According to the mechanism, each of the rotation members locates more outwardly in terms of the radial direction than each of the straight-moving interlocking parts; in other words, each of the former is arranged outside each of the latter. Therefore, it is possible to prevent the rotation interlocking mechanism for rotatably interlocking the rotation members with each other from interfering with the straight-moving member. Hence, with the mechanism, there is no need of providing a hole, or the like, on the straight-moving member for avoiding any interference with the rotation interlocking mechanism. In the mechanism, for example, the rotation member of one of adjacent pairs can be connected to the straight-moving member of the other of the adjacent pairs by a helicoid so that the lens barrel can project (or expand) and retract (or contract).

Accordingly, with the mechanism, the rigidity of the lens barrel is enhanced.

As an embodiment, the second straight-moving member of the second pair has more than one arm which adjoin the straight-moving interlocking part of the third straight-moving member, in which the more than one arm locate on the same circle in the plane perpendicular to the axial direction, and in which the more than one arm form the second straight-moving interlocking part of the second straight-moving member, and wherein at least one of the more than one arm has an insertion opening which is formed by cutting a body thereof from a side opposite to an object to be photographed in the axial direction, with a state in which the insertion opening is closed by a part of the body on a side of the object, and wherein the straight-moving interlocking part of the first straight-moving member is inserted into the insertion opening.

According to the mechanism, the insertion opening does not exist on a part of the body of the arm on the side of the object to be photographed; in other words, both edges of the body on the side of the object, defining the insertion opening, in the peripheral direction of the second straight-moving interlocking part, are connected to each other by the part of the body of the arm. Therefore, with the mechanism, the reduction in rigidity of the arm is effectively prevented, and accuracy of the lens barrel is secured and maintained.

As an embodiment, the first straight-moving member of the first pair has at least one arm which is adjacent to the first straight-moving interlocking part of the second straight-moving member, in which the arm is on the same circle in a plane perpendicular to the axial direction thereof, and in which the straight-moving interlocking part is formed on the at least one arm, wherein the at least one arm is arranged in a direction which is generally same as a direction in which a pair of longer sides of a rectangular light-receiving surface for receiving light focussed by the lens barrel oppose each other.

Regarding position of the arm of the first straight-moving member, in a case where the arm is mounted inwardly radially, there is a possibility that the arm may interfere with the flux of light (or beam of light) on the light receiving surface. On the other hand, however, interference of the arm with the flux of light reaching outside the light receiving surface, does not bring any problem. Considering these situations, it is advantageous to arrange the arm(s) in the direction which is generally same as the direction in which the pair of longer sides of the rectangular light-receiving surface face each other in a case that the light-receiving surface is rectangular in shape, because the area for allowing the arm to be arranged without such an interference is larger on the longer sides of the rectangular light-receiving surface than the shorter sides thereof. Accordingly, with the arrangement, not only the interference of the flux of light with the arm relative to the light-receiving surface is effectively prevented, but also the arm can be positioned more inwards radially, thus possible to make the lens barrel more compact. In the arrangement, it is preferable to mount a pair of the arms thereon, from a view point of strength and balance of the lens barrel.

In the mechanism, for example, the second straight-moving member of the second pair can have three arms which adjoin the straight-moving interlocking part of the third straight-moving member, in which the three arms locate on the same circumference in the plane perpendicular to the axial direction, and in which the three arms form the second straight-moving interlocking part of the second straight-moving member. Each of two of the three arms has an insertion opening, or space, through which the straight-moving interlocking part of the first straight-moving member is inserted, and the two of the three arms form the first straight-moving interlocking part of the second straight-moving member.

As an embodiment, at least one lens frame is mounted more inward than any one of the straight-moving interlocking part of the first straight-moving member, the first straight-moving interlocking part of the second straight-moving member, the second straight-moving interlocking part thereof, and the straight-moving interlocking part of the third straight-moving member, wherein the lens frame has an engagement part which projects radially outwardly, in which the engagement part engages with at least one rotation member which is selected from the first rotation member, the second rotation member and the third rotation member, and engage with at least one straight-moving member which is selected from the first straight-moving member, the second straight-moving member and the third straight-moving member, in which the at least one rotation member and the at least one straight-moving member form at least one pair which is selected from the first pair, the second pair and the third pair.

According to the mechanism, when the rotation member rotates relative to the corresponding straight-moving member in the pair, the at least one lens frame is moved relative to the pair in the axial direction. The engagement part, for example, can include a straight-moving guiding part which is guided linearly by the straight-moving interlocking part of the straight-moving member, and can include a cam follower which is guided by a spiral cam groove, or a spiral cam projection streak, provided on the corresponding rotation member.

According to the mechanism, the projection (or expansion) and the retraction (or contraction) of the lens barrel, and the movement of the lens, are performed with the same member, it is possible to make the lens barrel small-sized (or compact) and to realize a low cost thereof.

The engagement part of the lens frame is not necessarily required to engage with the rotation member and the straight-moving member of a particular pair. Alternatively, the engagement part thereof can be switched over between a first state in which the engagement part thereof engages with the rotation member and the straight-moving member of the particular pair, and a second state in which the engagement part thereof engages with the rotation member and the straight-moving member of another pair.

As an embodiment, a rotation member of one of the first pair and the second pair engages generally spirally with a straight-moving member of the other of the first pair and the second pair, in which the rotation member is one of the first rotation member and the second rotation member, and in which the straight-moving member is one of the second straight-moving member and the first straight-moving member.

As an embodiment, a rotation member of one of the second pair and the third pair engages generally spirally with a straight-moving member of the other of the second pair and the third pair, in which the rotation member is one of the second rotation member and the third rotation member, and in which the straight-moving member is one of the third straight-moving member and the second straight-moving member.

As an embodiment, a spirally engaging part of each of the rotation member and the corresponding straight-moving member extends continuously in a direction of its circumference, respectively.

In accomplishing the above objects of the present invention, according to still another aspect thereof, there is provided a lens barrel comprising: a fixed member; a first pair which has a first straight-moving member that movably engages with the fixed member in an axial direction of the lens barrel in which the first straight-moving member is guided linearly by the fixed member, and which has a first rotation member that is relatively rotatably connected to the first straight-moving member in which the first rotation member integrally moves together with the first straight-moving member in the axial direction thereof, wherein the first pair can project towards an object to be photographed with respect to the fixed member; a second pair which has a second straight-moving member that movably engages with the first straight-moving member in the axial direction, in which the second straight-moving member is guided linearly, and which has a second rotation member that is relatively rotatably connected to the second straight-moving member, in which the second rotation member integrally moves together with the second straight-moving member in the axial direction thereof, in which the second rotation member movably engages with the first rotation member in the axial direction with a state in which the second rotation member is prevented from rotating relative to the first rotation member, wherein the second pair can project towards the object to be photographed with respect to the first pair; and a third pair which has a third straight-moving member that movably engages with the second straight-moving member in the axial direction, in which the third straight-moving member is guided linearly, and which has a third rotation member that is relatively rotatably connected to the third straight-moving member, in which the third rotation member integrally moves together with the third straight-moving member in the axial direction thereof, in which the third rotation member movably engages with the second rotation member in the axial direction with a state in which the third rotation member is prevented from rotating relative to the second rotation member, wherein the third pair can project towards the object to be photographed with respect to the second pair, wherein a part of the second straight-moving member and a part of the first straight-moving member which movably engage with each other in the axial direction, are provided more inwardly radially than any one of the first rotation member and the second rotation member, wherein a part of the third straight-moving member and the part of the second straight-moving member which movably engage with each other in the axial direction, are provided more inwardly radially than any one of the second rotation member and the third rotation member, wherein the fixed member and the first rotation member are connected to each other by a drive force transmission mechanism for transforming a rotation drive force into a straight-moving drive force and for transmitting the straight-moving drive force, wherein the first rotation member and the second straight-moving member are connected to each other by a drive force transmission mechanism for transforming the rotation drive force into a straight-moving drive force and for transmitting the straight-moving drive force, and wherein the second rotation member and the third straight-moving member are connected to each other by a drive force transmission mechanism for transforming the rotation drive force into a straight-moving drive force and for transmitting the straight-moving drive force.

According to the mechanism, the first pair, the second pair, and the third pair, can project from the fixed member by three steps (or by three stages). In the mechanism, the drive force transmission mechanism can comprise a screw-connecting mechanism (or a helicoid-connecting mechanism), a cam-connecting mechanism, or the like.

In the mechanism, the first straight-moving member dose not intervene between the first rotation member and the second rotation member; and the second straight-moving member dose not intervene between the second rotation member and the third rotation member. With the mechanism, rotation, or rotation force, can be transmitted between the rotation members, and there is no need of making or forming a spiral space, or opening, on the straight-moving member.

According to the mechanism, there is no need of employing a component, or an element, having such a spiral space or opening which may incur reduction in rigidity thereof; therefore, it is possible to make a component or an element therefor smaller. In addition, with the mechanism, it is possible to enhance an accuracy of control by increasing the rotation angle of the rotation member. Also, with the mechanism, it is possible to realize a shielding of light by a simple construction. Also, according to the mechanism, there is no straight-moving member between the rotation members; therefore, it is possible to simplify the construction, or mechanism, for transmitting the rotation, or rotational force, between the rotation members.

Therefore, with the mechanism, the lens barrel can be downsized, or can be made compact or small.

Furthermore, in a case that a screw-connecting mechanism is employed for the drive force transmission mechanism for projecting and retracting the lens barrel, the part or region which the force is transmitted to, or exerted upon, is arranged around the periphery or circumference of the lens barrel. Therefore, with the mechanism, the rigidity of the lens barrel is surely enhanced.

As an embodiment, the first rotation member and the second straight-moving member are connected to each other by a screw which extends all around each of the first rotation member and the second straight-moving member, and wherein the second rotation member and the third straight-moving member are connected to each other by a screw which extends all around each of the second rotation member and the third straight-moving member.

According to the mechanism, the screw connecting mechanism exists all around each of the first rotation member, the second straight-moving member, the second rotation member, and the third straight-moving member. Therefore, with such a simple mechanism, the connecting part between the members is shielded all around them from light.

As an embodiment, the first straight-moving member has a first straight-moving interlocking part which extends in the axial direction, wherein the first rotation member has a helicoid on an inner surface thereof and has a rotation interlocking groove on the inner surface thereof, in which the rotation interlocking groove extends in the axial direction, and in which the rotation interlocking groove is formed by cutting out the helicoid radially up to a predetermined depth thereof, wherein the second straight-moving member has a second straight-moving interlocking part which extends in the axial direction, in which the second straight-moving interlocking part movably engages with the first straight-moving interlocking part in the axial direction, wherein the second rotation member has a projection on an outer surface thereof, in which the projection engages with the rotation interlocking groove of the first rotation member, in which the second rotation member has a helicoid on an inner surface thereof and has a rotation interlocking groove on the inner surface thereof, in which the rotation interlocking groove extends in the axial direction, and in which the rotation interlocking groove is formed by cutting out the helicoid radially up to a predetermined depth thereof, wherein the third straight-moving member has a third straight-moving interlocking part which extends in the axial direction, in which the third straight-moving interlocking part movably engages with the second straight-moving interlocking part in the axial direction, wherein the third rotation member has a projection on an outer surface thereof, in which the projection engages with the rotation interlocking groove of the second rotation member, wherein the first straight-moving interlocking part is arranged more inward radially than any one of the first rotation member and the second rotation member, and wherein the second straight-moving interlocking part is arranged more inward radially than any one of the second rotation member and the third rotation member.

According to the mechanism, the rotation interlocking groove in each of the first rotation member and the second rotation member is formed by cutting out the inner helicoid radially up to a predetermined depth thereof; namely, the rotation interlocking groove is formed by cutting the inner helicoid from inside towards outside up to the predetermined depth radially. Therefore, even if such a rotation interlocking groove is provided on each of the first rotation member and the second rotation member, light is prevented from entering therebetween by the helicoid connection parts.

As an embodiment, each of the first straight-moving interlocking part, the second straight-moving interlocking part and the third straight-moving interlocking part, is provided generally on the same circle or circumference which locates radially inside any one of the first rotation member, the second rotation member and the third rotation member.

According to the mechanism, each of radial thickness of the first straight-moving interlocking part, the second straight-moving interlocking part and the third straight-moving interlocking part, does not accumulate one over another. Therefore, with the mechanism, it is possible to make the lens barrel small and compact in size in the radial direction.

BRIEF DESCRIPTION OF THE DRAWINGS

This and other objects and features of the present invention will become clear from the following description taken in conjunction with the preferred embodiment thereof with reference to the accompanying drawings.

DETAILED DESCRIPTION OF THE PREFERRED EMBODIMENT

Before a description of a preferred embodiment of the present invention proceeds, it is to be noted that like or corresponding parts are designated by lice reference numerals throughout the accompanying drawings.

With reference to FIGS. 1 through 6, a description is made below upon a lens barrel 10 according to the preferred embodiment of the present invention.

Figure 1:
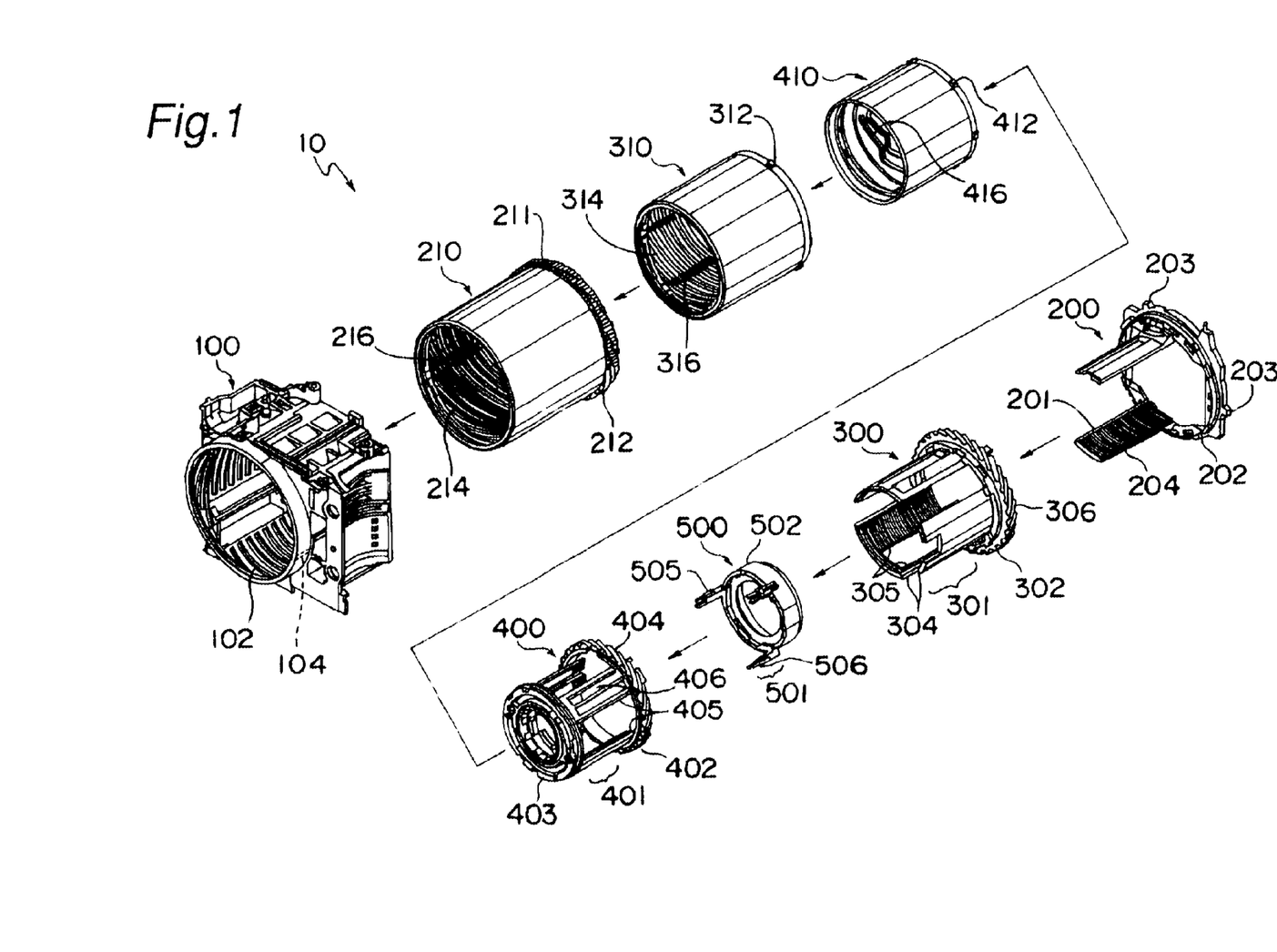
FIG. 1 is an exploded perspective view of a lens barrel according to a preferred embodiment of the present invention.

The lens barrel 10 is, as shown in an exploded perspective view of FIG. 1, assembled by inserting a first rotation member 210, a second rotation member 310, a cam ring (or a third rotation member) 410, a first lens movement frame (or a third straight-moving member) 400, a second lens frame 500, a second straight-moving member 300 and a first straight-moving member 200 in this order from a rear side, opposite an object (or a subject) to be photographed, of a fixed barrel (or a stationary barrel) 100 which is fixed to a camera body.

The first rotation member 210 is combined with the first straight-moving member 200 as a first pair; the second rotation member 310 is combined with the second straight-moving member 300 as a second pair; and the cam ring 410 is combined with the first lens movement frame 400 as a third pair. In the construction, these three pairs can be projected from the fixed barrel 100, bad three steps or by three stages. In other words, the lens barrel 10 is constructed as a three-step (or three-stage) lens barrel. The first rotation member 210 and the first straight-moving member 200, as the first pair, are connected to each other by a bayonet; the second rotation member 310 and the second straight-moving member 300, as the second pair, are connected to each other by a bayonet; and the third rotation member 410 and the third straight-moving member 400, as the third pair, are connected to each other by a bayonet. In the construction, each rotation member 210, 310, 410 in each pair can rotate relative to each straight-moving member 200, 300, 400, respectively. However, each rotation member 210, 310, 410 in each pair can not move relative to each straight-moving member 200, 300, 400, in an axial direction of the lens barrel 10; in other words, each rotation member 210, 310, 410 can move integrally with each straight-moving member 200, 300, 400, in the axial direction thereof.

The fixed barrel 100 has a hole, an inner surface of which has a helicoid 102 and a plurality of straight-moving guide grooves 104 extending in the axial direction. The fixed barrel 100 has a penetration hole which extends in a radial direction of the lens barrel 100, and which allows the outside of the lens barrel 10 to communicate with the hole. Also, there is arranged a long gear for driving a lens, in parallel with the axis of the hole of the fixed barrel 100.

The first rotation member 210 is a generally cylindrical member which is inserted into the hole of the fixed barrel 100. The first rotation member 210 has a gear part 211 on its outer rear end, with which the long gear for driving the lens engages, and it also has a helicoid 212 on its outer rear end, with which the helicoid 102 of the fixed barrel 100 engages. In the construction, when the long gear is driven to be rotated, the first rotation member 210 is rotated relative to the fixed barrel 100 and is moved relative to the fixed barrel 100 in the axial direction.

Furthermore, the first rotation member 210 also has a helicoid 214 on its inner surface, and it has a plurality of straight-moving guide grooves 216 thereon extending in the axial direction, in which the plurality thereof are arranged equally (i.e. arranged with an equal distance between adjacent straight-moving guide grooves 216) around the inner peripheral surface thereof.

The second rotation member 310 is a generally cylindrical member which is inserted inside the first rotation member 210. The second rotation member 310 has a projection 312, on its outer rear end, which engages with the straight-moving guide groove 216 of the first rotation member 210. With the construction, the first rotation member 210 and the second rotation member 310 are prevented from rotating relative to each other, and the first rotation member 210 and the second rotation member 310 can move relative to each other in the axial direction with a state in which the first rotation member 210 and the second rotation member 310 rotate together integrally. The second rotation member 310 has an inner surface on which a helicoid 314, and a plurality of straight-moving guide grooves 316 extending in the axial direction, are formed.

The cam ring 410 is a generally cylindrical member which is inserted inside the second rotation member 310, and it has a projection 412, on its outer rear end, which engages with the straight-moving guide groove 316 of the second rotation member 310. With the construction, the second rotation member 310 and the cam member 410 are prevented from rotating relative to each other, and the second rotation member 310 and the cam member 410 can move relative to each other in the axial direction with a state in which the second rotation member 310 and the cam member 410 rotate together integrally.

The cam ring 410 has an inner surface on which a plurality of second cam grooves 416 for driving a second lens group 82 (refer to FIGS. 2 through 5) are formed. The lens barrel 10 is for a zoom focus lens, in which each second cam groove 416 includes a zooming region for changing the focal length (focal distance) and a focussing region for changing the focussing position, where the zooming region and the focussing region are arranged alternately.

The first lens movement frame 400 is a generally cylindrical member which has a first lens frame part 403 on its front end, a flange part 402 on its rear end, and a connection part 401 which connects the first lens frame part 403 and the flange part 402.

The first lens frame part 403 holds a first lens group 81 (refer to FIGS. 2 through 5). The flange part 402 of the first lens movement frame 400 has a helicoid 404, around its periphery, which engages with the helicoid 314 of the second rotation member 310. With the construction, when the second rotation member 310 rotates, the cam ring 410 and the first lens movement frame 400 move relative to the second rotation member 310 in the axial direction. The connection part 401 has a partial cutout, extending in the axial direction, as a straight-moving guide groove 405 and as a second lens frame guide groove 406.

The second lens frame 500 has a second lens frame part 502 for holding the send lens group 82 (refer to FIGS. 2 thought 5), and the second lens frame part 502 has a peripheral surface on which a plurality of arm parts 501 are fixed. Each arm part 501 has a straight-moving guide part 505 which extends in a direction of its periphery or circumference, and it has a cam follower projection 506 which projects radially outwardly. Each arm part 501 is inserted into the second lens frame guide groove 406 of the connection part 401 of the first lens movement frame 400; and each straight-moving guide part 505 slidably contacts a side surface of the second lens frame groove 406. The cam follower projection 506 engages with the second cam groove 416 of the cam ring 410.

The second straight-moving member 300 has a generally cylindrical straight-moving guide part 301, and it has a flange part 302, on a rear end of the straight-moving guide part 301, which extends radially outwardly. The straight-moving guide part 301 exists partially in the direction of the periphery, and it is inserted into the straight-moving guide groove 405 of the connection part 401 of the first lens movement frame 400, in which a side of the straight-moving guide part 301 and a side of the straight-moving guide groove 405 slidably contact to each other. With the construction, the second straight-moving member 300 and the first lens movement frame 400 are prevented from rotating relative to each other, and the second straight-moving member 300 and the first lens movement frame 400 move relative to each other in the axial direction. The straight-moving guide part 301 has three sub-parts, as shown in FIG. 1, and each of two out of the three sub-parts has a straight-moving guide groove 305 which extends axially from the rear side of the straight-moving guide part 301 towards the front side thereof partially. Namely, each of the two out of the three sub-parts has the straight-moving guide groove 305 which is formed by cutting a body of the sub-part from a side opposite to an object to be photographed in the axial direction of the lens barrel, with a state in which the straight-moving guide groove 305 is closed by a part of the body on a side of the object, as shown in FIG. 1. The flange part 302 of the second straight-moving member 300 has an outer surface on which a helicoid 306 engaging with the helicoid 214 of the first rotation member 210 is formed. With the construction, the second straight-moving member 300 and the second rotation member 310 move relative to the first rotation member 210 in the axial direction when the first rotation member 210 rotates.

The first straight-moving member 200 has a ring part 202 and it has a pair of first straight-moving guide parts 201 connected to the ring part 202, in which the guide parts 201 extend towards the front part of the lens barrel 10 in the axial direction, and in which the pair thereof locate radially inwardly relative to the ring part 202. The ring part 202 has an outer peripheral surface (or circumferential surface) on which a plurality of projections 203 engaging with straight-moving guide grooves 104 of the fixed barrel 100 are formed. The first straight-moving guide part 201 is inserted into the straight-moving guide groove 305 of the straight-moving guide part 301 of the second straight-moving member 300, in which a side surface 204 of the first straight-moving guide part 201 slidably contacts a side surface of the straight-moving guide groove 305. With the construction, the first straight-moving member 200 and the second straight-moving member 300 are prevented from rotating relative to each other, and the first straight-moving member 200 and the second straight-moving member 300 can be moved relative to each other in the axial direction.

Figure 6:
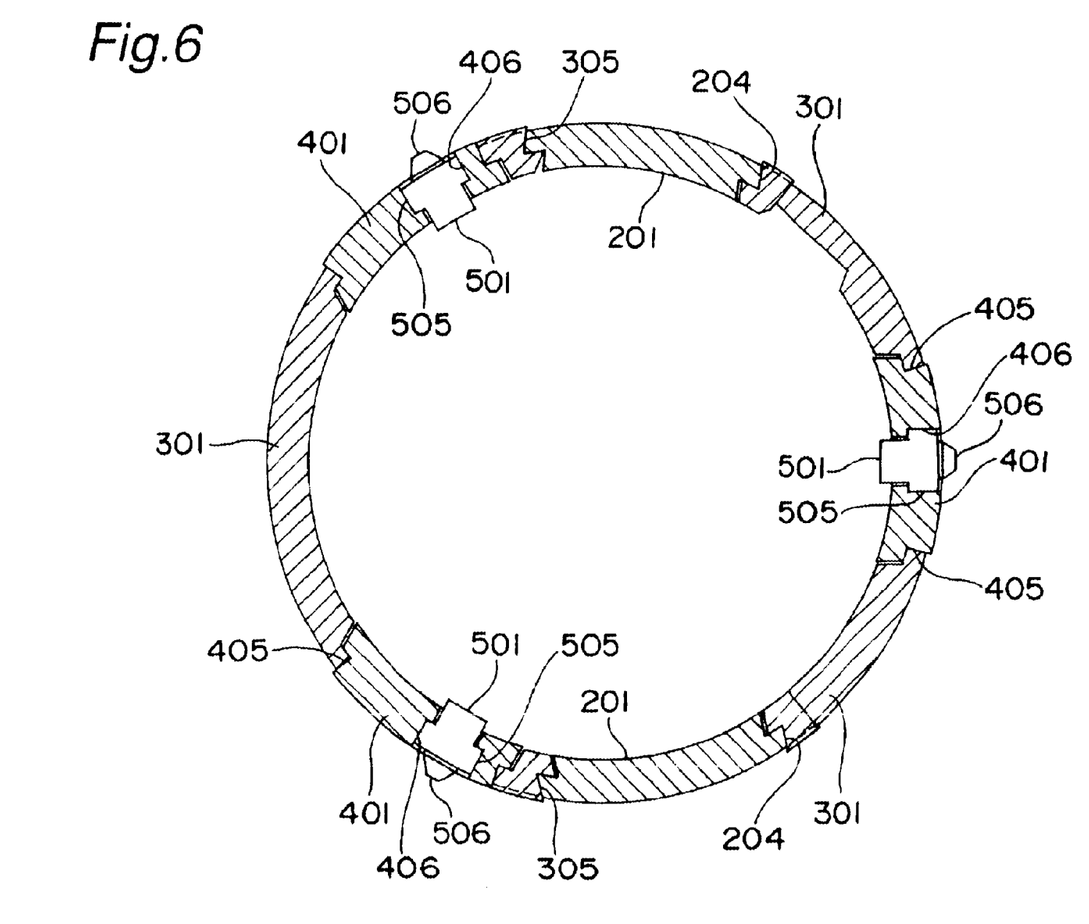
FIG. 6 is a cross sectional view of a main part of the lens barrel of FIG. 1, in which the cross sectional view is shown in an axial direction thereof.

As shown in FIG. 6 in which the lens barrel 10 is shown axially from its rear side as a cross sectional view, the connection part 401 of the first lens movement frame 400, the arm part 501 of the second lens frame 500, the straight-moving guide part 301 of the second straight-moving member 300, and the first straight-moving guide part 201 of the first straight-moving member 200, are arranged generally on the same circle, or circumference.

That is, such a plurality of straight-moving interlocking parts which are related to a driving mechanism for driving a plurality of lens groups, are positioned generally on the same radius of the circle. With this arrangement, the lens barrel 10 can be downsized, or can be made smaller.

More specifically, a force is exerted upon each of the straight-moving interlocking parts locating in the circumferential direction. According to the arrangement of the embodiment, the straight-moving interlocking parts are positioned, generally, on the same radius of the circle, as aforementioned. Therefore, there is no radial deviation in place of action of force in the direction of the circumference thereof amongst the plurality of straight-moving interlocking parts which locate backward and forward in the direction of the axis; therefore, a couple of forces are not generated thereamong. Consequently, in spite of the components or members including the straight-moving interlocking parts being small and compact, enough strength thereof can be secured.

Also, generally, according to the conventional multiple-step lens barrel, a rotation member and a straight-moving member which form a pair for each step or stage, are positioned so as to be adjacent to each other; and the rotation member and the straight-moving member are arranged one over the other in the radial direction when the barrel is collapsed. Therefore, with the arrangement, it is not possible to make the radial thickness of the lens barrel smaller than the sum of the radial thickness of the rotation member at each step and the radial thickness of the straight-moving member at the each step. In contrast with this arrangement, according to the embodiment of the present invention, each of the straight-moving members at the steps is arranged generally in the same radius, or arranged generally on the same circle, as shown in FIG. 6. Namely, with the arrangement, it is possible to avoid accumulation of the radial thickness of the straight-moving members at the steps. Therefore, it is possible to reduce the dimension of the lens barrel in the radial direction.

As shown in FIG. 1, the pair of first straight-moving guide parts 201, opposite to each other, of the first straight-moving member 200, are arranged up and down so that the pair thereof locate at the positions corresponding to the positions at which a pair of longer sides, opposite to each other, of a rectangular light-receiving surface on which an image of an object, or subject, to be photographed is focussed by the lens barrel 10, locate. In the mechanism, in a case that the pair of first straight-moving guide parts 201 are arranged radially inwardly to excess, the pair thereof interfere with the flux of light (or luminous flux) which is to reach the light-receiving surface on the longer sides thereof However, even if the pair thereof interfere with the flux of light outside the longer sides thereof, there is no problem. Therefore, it is possible to make the lens barrel 10 smaller, or more compact, by arranging the pair of first straight-moving guide parts 201 radially inwardly as much as possible so that the pair thereof are not obstacles to prevent the passage of the flux of light with respect to the light-receiving surface.

Therefore, with the mechanism, it is possible to downsize the lens barrel, even thought the lens barrel is of the multiple-step type.

Also, according to the mechanism, each pair composed of the rotation member 210, 310, 410 and the straight-moving member 200, 300, 400, expands (or projects) and contracts (or retracts) with other pair, through the helicoid connection therebetween. That is, even if any unprepared force is exerted upon the lens barrel 10 in the axial direction, the unprepared force is received by a larger area, or region, of the helicoid connection than that of a cam mechanism. Therefore, compared with the lens barrel which contracts and expands through the cam mechanism, higher rigidity of the lens barrel is ensured at low cost.

Figure 2:
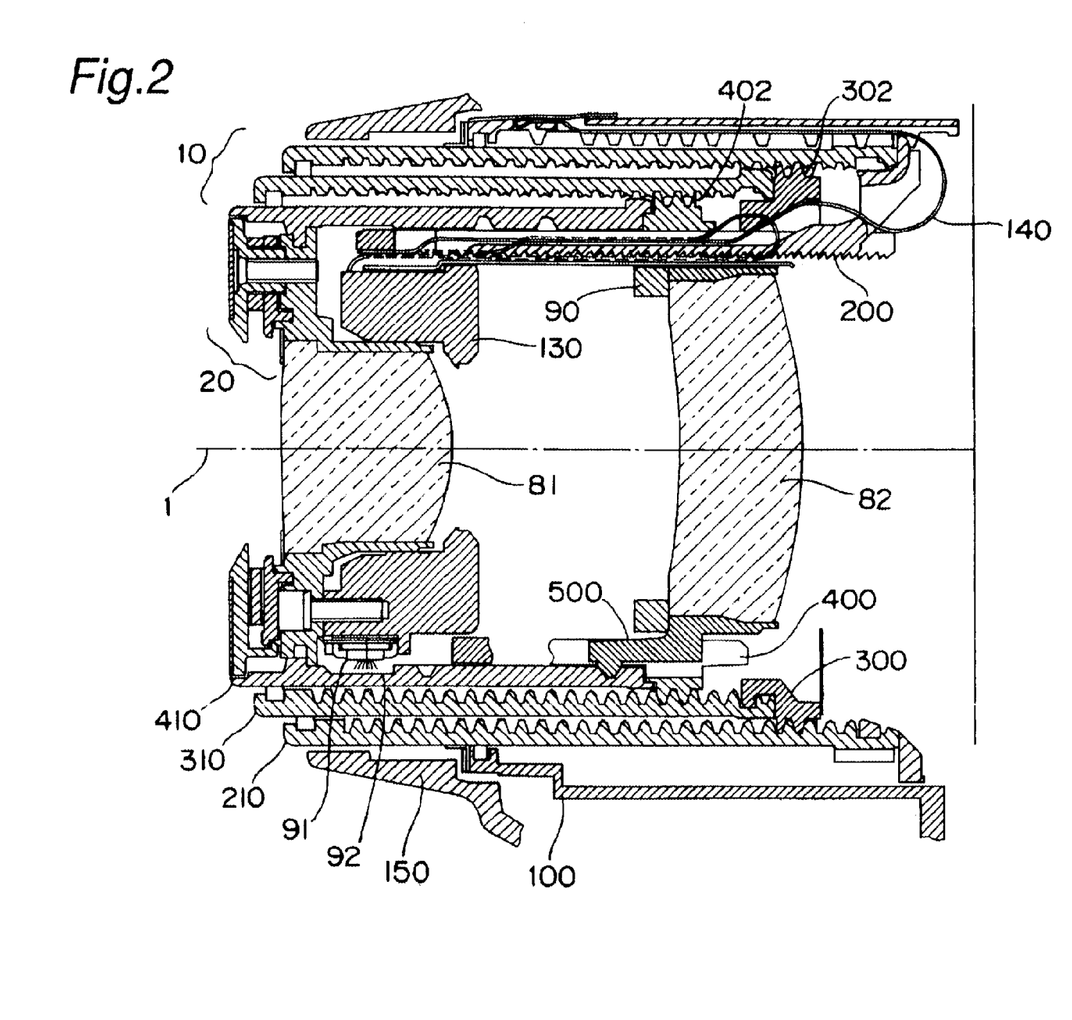
FIG. 2 is a cross sectional view of the lens barrel of FIG. 1, in which the lens barrel is in a condition of its wideanlge end.
Figure 3:
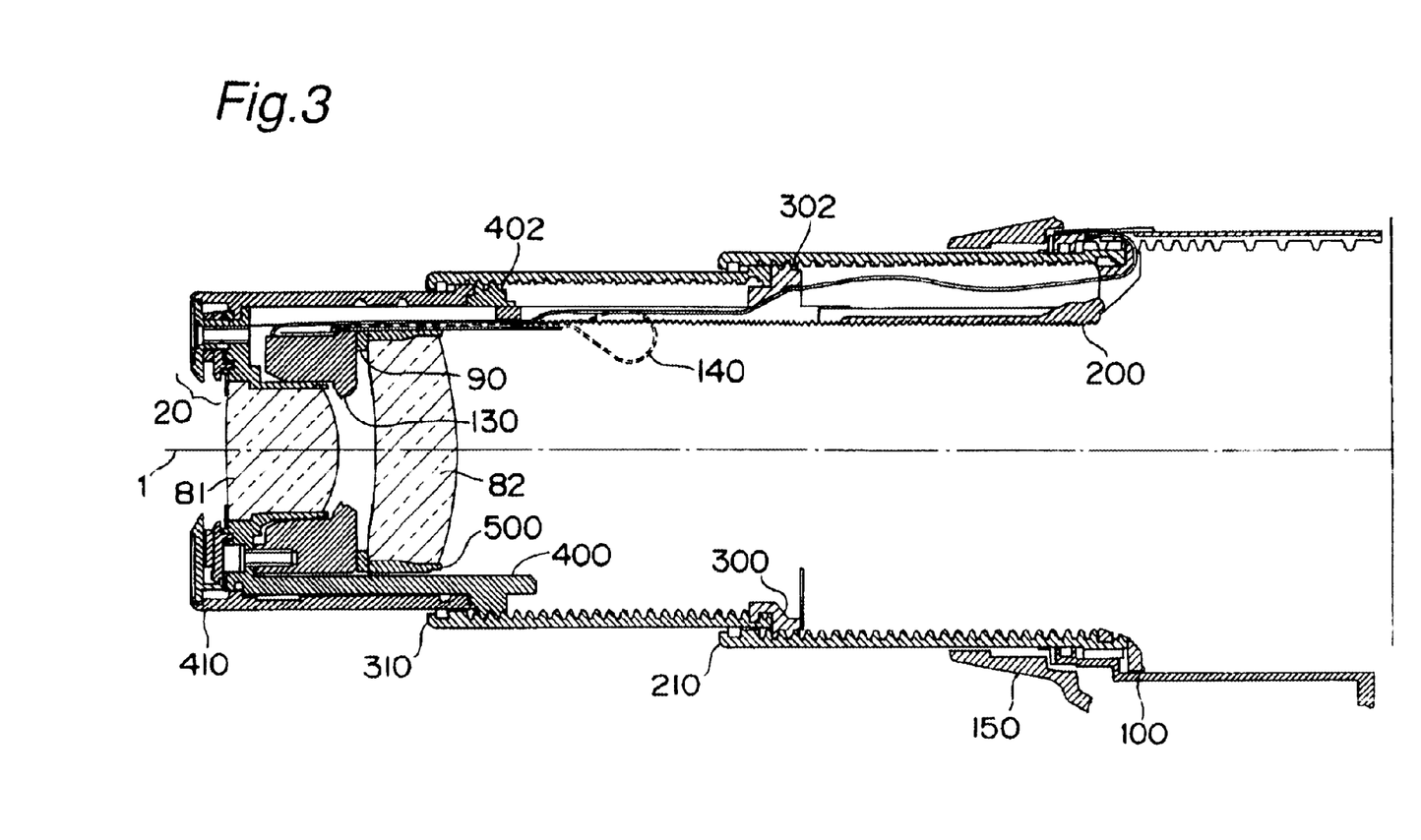
FIG. 3 is a cross sectional view of the lens barrel of FIG. 1, in which the lens barrel is in a condition of its telephoto end.
Figure 4:
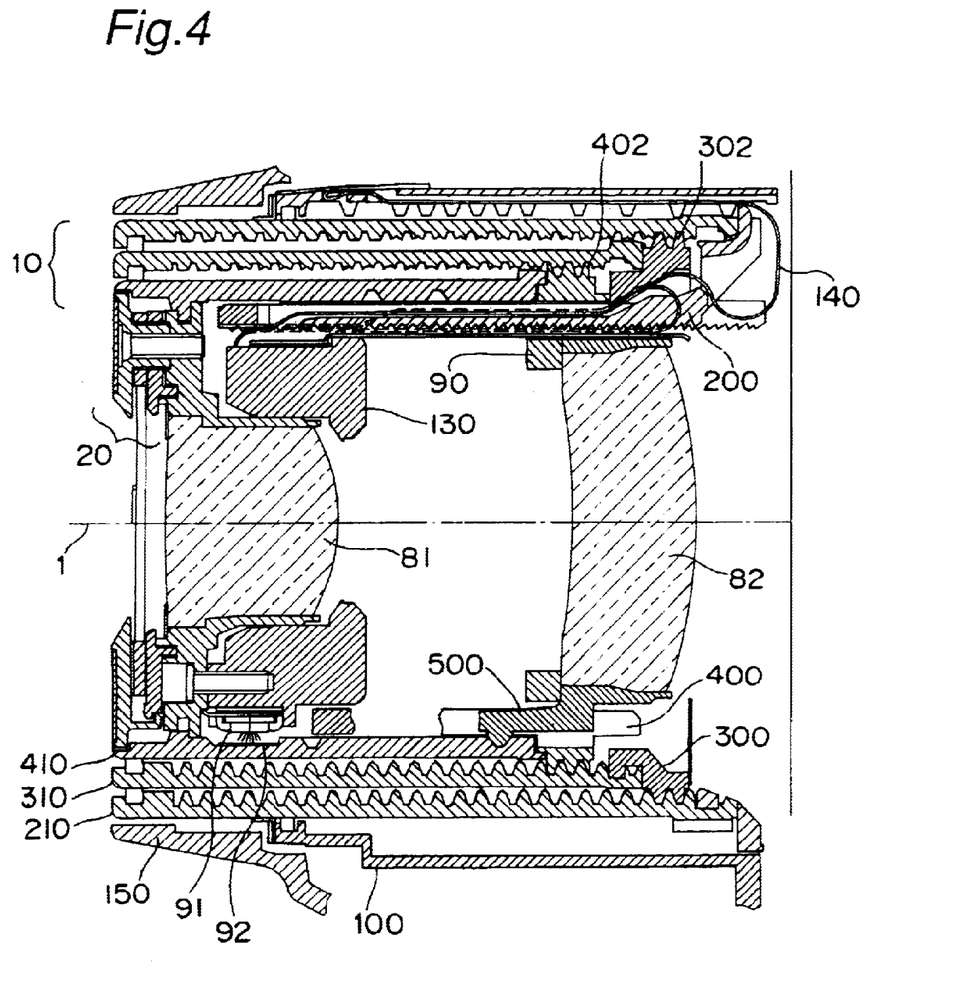
FIG. 4 is a cross sectional view of the lens barrel of FIG. 1, in which the lens barrel is in a condition of its barrel collapse end.

Each of FIGS. 2 to 4 is a cross sectional view showing a state in which the lens barrel 10 is mounted, or incorporated, to a camera body. Namely, FIG. 2 shows that the lens barrel 10 is in the state of wideangle end, or in the state in which the focal length is the shortest; FIG. 3 shows that the lens barrel 10 is in the state of telephoto end, or in the state in which the focal length is the longest; and FIG. 4 shows that the lens barrel 10 is in the state of barrel collapse end, or in the state in which the lens barrel 10 is fully contracted or retracted. In the figures, a reference numeral 1 indicates an optical axis of the lens barrel 10, and a reference numeral 150 indicates a cover which is mounted on the camera body.

As shown in the figures, there is mounted a lens barrier unit 20 on a tip side part (i.e. on the side of the object to be photographed) of the lens barrel 10.

A shutter unit 130 is fixed on the first lens movement frame 400, adjacent to the first lens group 81. The shutter unit 130 has a sector on a back side (i.e. side opposite to the object to be photographed) of the first lens group 81, in which the sector can open and close. The shutter unit 130 has a photo reflector 91 for detecting a pattern formed on a pattern board 92 which adheres to an inner surface of the cam ring (or third rotation member) 410. Both of the shutter unit 130 and the photo reflector 91 are electrically connected to a control unit of the camera body, via a flexible printed circuit board 140.

Also, there is mounted an annular light shielding member 90 which is fixed on a front surface of the second lens frame 500 along its periphery. The light shielding member 90 is fixed thereon, for example, by a two-sided tape. The light shielding member 90 is an elastic member which is made of a mortoprain. The mortoprain having desired properties or characteristics, is easy to make by controlling the amount of compression exerted thereon in the manufacturing process. Alternatively, as such an elastic member, a member made of rubber, a member made of flocked fabric (or teremp), a member made of urethane foam, or a cantilevered concertina type of member, for example, can be employed.

As shown in FIG. 3, when the second lens group 82 approaches the first lens group 81, the light shielding member 90 abuts against a rear surface (or back surface) of the shutter unit 130, so that the light shielding member 90 deforms elastically (i.e. deforms by compression). Hereat, because there is enough space between the inner surface of the connection part 401 of the first lens movement frame 400 and the outer edge part of the light shielding member 90, the light shielding member 90 can be expanded outwardly freely (i.e. the outer diameter of the member 90 can be freely increased). Therefore, the second lens frame 500 can freely move inside the connection part 401 thereof towards the shutter unit 130, without being hindered by the deformation of the light shielding member 90 due to its compression.

Figure 5:
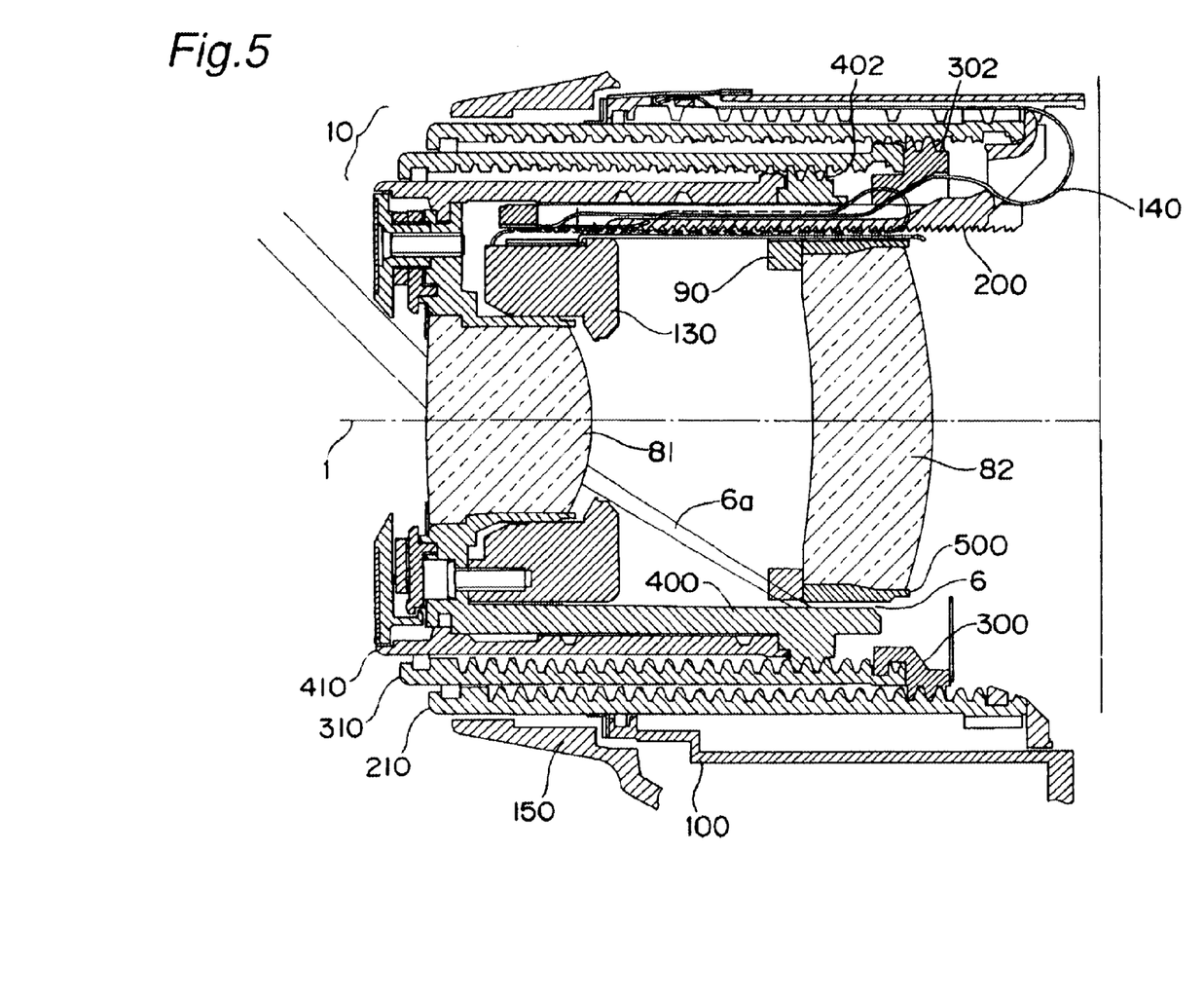
FIG. 5 is an explanatory cross sectional view of the lens barrel of FIG. 1, showing how light is blocked or shielded.

On the other hand, as shown in FIGS. 2, 4 and 5, when the second lens group 82 moves away from the first lens group 81, the light shielding member 90 returns to its original shape by its elasticity. As shown in FIG. 5, when the light shielding member 90 has returned to its original shape, the member 90 prevents the flux of light (or luminous flux or beam of light) 6a from reaching the light receiving surface of the camera through a space (or gap) 6 between the outside of the second lens frame 500 and the inside of the connection part 401 of the first lens movement frame 400.

The light shielding member 90 is made of the elastic member as aforementioned. Therefore, with such a simple construction, even if the distance between the first lens group 81 and the second lens group 82 becomes small, it is possible not only to mount the shutter unit 130 therebetween, but also to prevent the light from entering the outside of the second lens group 82.

Next, it is explained about the movement, or operation, of the lens barrel 10.

The first straight-moving member 200, the second straight-moving member 300, the first lens movement frame 400, and the second lens frame 500, do not rotate to each other and do not rotate relative to the fixed barrel 100, by their mutual engagements; and these components 200, 300, 400 and 500 move to each other in the axial direction and move relative to the fixed barrel 100 in the axial direction. Meanwhile, when the first rotation member 210 is rotated by the long gear, the second rotation member 310 and the cam ring 410 are also integrally rotated together with the first rotation member 210, by the mutual engagement between the straight-moving guide groove 216 of the first rotation member 210 and the projection 312 of the second rotation member 310 and by the mutual engagement between the straight-moving guide groove 316 of the second rotation member 310 and the projection 412 of the cam ring 410.

When the first rotation member 210 is rotated, this member 210 and the first straight-moving member 200 move together axially relative to the fixed barrel 100, by the mutual engagement between the helicoid 102 of the fixed barrel 100 and the helicoid 212 of the first rotation member 210. Also, since the helicoid 214 of the first rotation member 210 engages with the helicoid 306 of the second straight-moving member 300, both of the second straight-moving member 300 and the second rotation member 310 moves axially relative to both of the first rotation member 210 and the first straight-moving member 200. Furthermore, since the helicoid 314 of the second rotation member 310 engages with the helicoid 404 of the first lens movement frame 400, both of the first lens movement frame 400 and the cam ring 410 moves axially relative to both of the second rotation member 310 and the second straight-moving member 300 when the second rotation member 310 is rotated by and together with the first rotation member 210.

That is, when the long gear rotates in the forward direction, the lens barrel 10 expands from a state as shown in FIG. 4 in which the lens barrel 10 is in the state of the barrel collapse end, to a state as shown in FIG. 3 in which the lens barrel 10 is in the state of the telephoto end (i.e. a state in which the focal length is the longest), via a state as shown in FIG. 2 in which the lens barrel 10 is in the state of the wideangle end (i.e. a state in which the focal length is the shortest). On the other hand, when the long gear rotates in the backward direction, the lens barrel 10 contracts from the state of the aforementioned telephoto end (see FIG. 3) to the state of the aforementioned barrel collapse end (see FIG. 4).

As apparent from the above explanation, according to the embodiment, the straight-moving interlocking elements or components (i.e. the first straight-moving member 200, the second straight-moving member 300, the second lens frame 500, and the first lens movement frame 400) in the multiple-step zoom lens barrel (or in the multistage zoom lens barrel) are arranged in a circle, or circumference, having almost the same radius. With this construction, it is possible to prevent the zoom lens barrel from becoming larger although the zoom lens barrel is of the type of the multiple-step zoom lens barrel.

Also, regarding the first pair (which has the first rotation member 210 and the first straight-moving member 200) and the second pair (which has the second rotation member 310 and the second straight-moving member 300), or regarding the second pair and the third pair (which has the cam ring 410 and the first lens movement frame 400), the rotation member of one of the two pairs and the straight-moving member of the other of the two pairs mutually engage with each other through the helicoid, so that the rotation member and the straight-moving member move relative to each other in the axial direction of the lens barrel 10. According to the mechanism, it is possible to secure a large contacting area (or large engagement area) between the rotation member and the straight-moving member in the axial direction. Therefore, with the mechanism, the rigidity, or strength, of the lens barrel is surely enhanced.

Also, the above contacting area therebetween is continuous in the direction of the periphery, or circumference, of each pair. Therefore, with the construction, it is possible to prevent light from entering the space, or gap, between the corresponding adjacent pairs. Namely, with the construction, a low manufacturing cost of the lens barrel 10 can be realized.

Although the present invention has been fully described in connection with the preferred embodiment thereof with reference to the accompanying drawings, it is to be noted that various other changes and modifications are apparent to those skilled in the art. Such changes and modifications are to be understood as include within the scope of the present invention as defined by the appended claims unless they depart therefrom.

What is claimed is:

1. A lens barrel comprising:

a fixed lens barrel member;

a first straight-moving member for guiding a first lens barrel member movably in an axial direction of the fixed lens barrel member;

a second straight-moving member for guiding a second lens barrel member movably in the axial direction of the fixed lens barrel member, in which the second straight-moving member is provided generally on a same circle, in a plane perpendicular to the axial direction thereof, as that of the first straight-moving member; and a third straight-moving member for guiding a third lens barrel member movably in the axial direction of the fixed lens barrel member, in which the third straight-moving member is provided generally on the same circle, in the plane perpendicular to the axial direction thereof, as that of the first straight-moving member.

2. The lens barrel as claimed in claim 1, wherein the first lens barrel member and the first straight-moving member form a first pair; the second lens barrel member and the second straight-moving member form a second pair; and the third lens barrel member and the third straight-moving member form a third pair, and wherein a lens barrel member of at least one of the first pair, the second pair, and the third pair, is rotatably connected to a straight-moving member thereof, in which the lens barrel member and the straight-moving member can move integrally in the axial direction.

3. The lens barrel as claimed in claim 1, wherein a location of each of the first straight-moving member, the second straight-moving member and the third straight-moving member, is more inward radially than any location of the first lens barrel member, the second lens barrel member and the third lens barrel member.

4. A lens barrel comprising:

a fixed member;

a first pair which has a first straight-moving member having a straight-moving interlocking part wherein the first straight-moving member is movably guided by the fixed member in an axial direction of the lens barrel, and which has a first rotation member that is relatively rotatably connected to the first straight-loving member, wherein the first rotation member moves integrally with the first straight-moving member in the axial direction;

a second pair which has a second straight-moving member having a first straight-moving interlocking part that engages movably with the straight-moving interlocking part of the first straight-moving member in the axial direction and having a second straight-moving interlocking part different from the first straight-moving interlocking part, and which has a second rotation member that is relatively rotatably connected to the second straight-moving member, wherein the second rotation member moves integrally with the second straight-moving member in the axial direction, and wherein the second pair can project on a side of an object to be photographed with respect to the first pair; and a third pair which has a third straight-moving member having a straight-moving interlocking part that engages movably with the second straight-moving interlocking part of the second straight-moving member in the axial direction, and which has a third rotation member that is relatively rotatably connected to the third straight-moving member, wherein the third rotation member moves integrally with the third straight-moving member in the axial direction, and wherein the third pair can project on the side of the object to be photographed with respect to the second pair, wherein the straight-moving interlocking part of the first straight-moving member, the first straight-moving interlocking part of the second straight-moving member, the second straight-moving interlocking part of the second straight-moving member, and the straight-moving interlocking part of the third straight-moving member, are provided generally on a same circle in a plane perpendicular to the axial direction thereof.

5. The lens barrel as claimed in claim 4, wherein each of the straight-moving interlocking part of the first straight-moving member, the first straight-moving interlocking part of the second straight-moving member, the second straight-moving interlocking part of the second straight-moving member, and the straight-moving interlocking part of the third straight-moving member, is more inward radially than any location of the first rotation member, the second rotation member and the third rotation member.

6. The lens barrel as claimed in claim 4, wherein the second straight-moving member of the second pair has more than one arm which adjoin the straight-moving interlocking part of the third straight-moving member, in which the more than one arm locate on the same circle in the plane perpendicular to the axial direction, and in which the more than one arm form the second straight-moving interlocking part of the second straight-moving member, and wherein at least one of the more than one arm has an insertion opening which is formed by cutting a body thereof from a side opposite to an object to be photographed in the axial direction, with a state in which the insertion opening is closed by a part of the body on a side of the object, and wherein the straight-moving interlocking part of the first straight-moving member is inserted into the insertion opening.

7. The lens barrel as claimed in claim 4, wherein the first straight-moving member of the first pair has at least one arm which is adjacent to the first straight-moving interlocking part of the second straight-moving member, in which the arm is on the same circle in a plane perpendicular to the axial direction thereof, and in which the straight-moving interlocking part is formed on the at least one arm, wherein the at least one arm is arranged in a direction which is generally same as a direction in which a pair of longer sides of a rectangular light-receiving surface for receiving light focussed by the lens barrel oppose each other.

8. The lens barrel as claimed in claim 4, wherein at least one lens frame is mounted more inward than any one of the straight-moving interlocking part of the first straight-moving member, the first straight-moving interlocking part of the second straight-moving member, the second straight-moving interlocking part thereof, and the straight-moving interlocking part of the third straight-moving member, wherein the lens frame has an engagement part which projects radially outwardly, in which the engagement part engages with at least one rotation member which is selected from the first rotation member, the second rotation member and the third rotation member, and engages with at least one straight-moving member which is selected from the first straight-moving member, the second straight-moving member and the third straight-moving member, in which the at least one rotation member and the at least one straight-moving member form at least one pair which is selected from the first pair, the second pair and the third pair.

9. The lens barrel as claimed in claim 4, wherein a rotation member of one of the first pair and the second pair engages generally spirally with a straight-moving member of the other of the first pair and the second pair, in which the rotation member is one of the first rotation member and the second rotation member, and in which the straight-moving member is one of the second straight-moving member and the first straight-moving member.

10. The lens barrel as claimed in claim 4, wherein a rotation member of one of the second pair and the third pair engages generally spirally with a straight-moving member of the other of the second pair and the third pair, in which the rotation member is one of the second rotation member and the third rotation member, and in which the straight-moving member is one of the third straight-moving member and the second straight-moving member.

11. The lens barrel as claimed in claim 9, wherein a spirally engaging part of each of the rotation member and the straight-moving member extends continuously circumferentially, respectively.

12. The lens barrel as claimed in claim 10, wherein a spirally engaging part of each of the rotation member and the straight-moving member extends continuously circumferentially, respectively.

13. A lens barrel comprising:

a fixed member;

a first pair which has a first straight-moving member that movably engages with the fixed member in an axial direction of the lens barrel in which the first straight-moving member is guided linearly by the fixed member, and which has a first rotation member that is relatively rotatably connected to the first straight-moving member in which the first rotation member integrally moves together with the first straight-moving member in the axial direction thereof, wherein the first pair can project towards an object to be photographed with respect to the fixed member;

a second pair which has a second straight-moving member that movably engages with the first straight-moving member in the axial direction, in which the second straight-moving member is guided linearly, and which has a second rotation member that is relatively rotatably connected to the second straight-moving member, in which the second rotation member integrally moves together with the second straight-moving member in the axial direction thereof, in which the second rotation member movably engages with the first rotation member in the axial direction with a state in which the second rotation member is prevented from rotating relative to the first rotation member, wherein the second pair can project towards the object to be photographed with respect to the first pair; and a third pair which has a third straight-moving member that movably engages with the second straight-moving member in the axial direction, in which the third straight-moving member is guided linearly, and which has a third rotation member that is relatively rotatably connected to the third straight-moving member, in which the third rotation member integrally moves together with the third straight-moving member in the axial direction thereof, in which the third rotation member movably engages with the second rotation member in the axial direction with a state in which the third rotation member is prevented from rotating relative to the second rotation member, wherein the third pair can project towards the object to be photographed with respect to the second pair, wherein a part of the second straight-moving member and a part of the first straight-moving member which movably engage with each other in the axial direction, are provided more inwardly radially than any one of the first rotation member and the second rotation member, wherein a part of the third straight-moving member and the part of the second straight-moving member which movably engage with each other in the axial direction, are provided more inwardly radially than any one of the second rotation member and the third rotation member, wherein the fixed member and the first rotation member are connected to each other by a drive force transmission mechanism for transforming a rotation drive force into a straight-moving drive force and for transmitting the straight-moving drive force, wherein the first rotation member and the second straight-moving member are connected to each other by a drive force transmission mechanism for transforming the rotation drive force into a straight-moving drive force and for transmitting the straight-moving drive force, and wherein the second rotation member and the third straight-moving member are connected to each other by a drive force transmission mechanism for transforming the rotation drive force into a straight-moving drive force and for transmitting the straight-moving drive force.

14. The lens barrel as claimed in claim 13, wherein the first rotation member and the second straight-moving member are connected to each other by a screw which extends around each of the first rotation member and the second straight-moving member, and wherein the second rotation member and the third straight-moving member are connected to each other by a screw which extends around each of the second rotation member and the third straight-moving member.

15. The lens barrel as claimed in claim 13, wherein the first straight-moving member has a first straight-moving interlocking part which extends in the axial direction, wherein the first rotation member has a helicoid on an inner surface thereof and has a rotation interlocking groove on the inner surface thereof, in which the rotation interlocking groove extends in the axial direction, and in which the rotation interlocking groove is formed by cutting out the helicoid radially up to a predetermined depth thereof, wherein the second straight-moving member has a second straight-moving interlocking part which extends in the axial direction, in which the second straight-moving interlocking part movably engages with the first straight-moving interlocking part in the axial direction, wherein the second rotation member has a projection on an outer surface thereof, in which the projection engages with the rotation interlocking groove of the first rotation member, in which the second rotation member has a helicoid on an inner surface thereof and has a rotation interlocking groove on the inner surface thereof, in which the rotation interlocking groove extends in the axial direction, and in which the rotation interlocking groove is formed by cutting out the helicoid radially up to a predetermined depth thereof, wherein the third straight-moving member has a third straight-moving interlocking part which extends in the axial direction, in which the third straight-moving interlocking part movably engages with the second straight-moving interlocking part in the axial direction, wherein the third rotation member has a projection on an outer surface thereof, in which the projection engages with the rotation interlocking groove of the second rotation member, wherein the first straight-moving interlocking part is arranged more inward radially than any one of the first rotation member and the second rotation member, and wherein the second straight-moving interlocking part is arranged more inward radially than any one of the second rotation member and the third rotation member.

16. The lens barrel as claimed in claim 13, wherein each of the first straight-moving interlocking part, the second straight-moving interlocking part and the third straight-moving interlocking part, is arranged generally on a same circle which locates radially inside any one of the first rotation member, the second rotation member and the third rotation member.

* * * * *